United States Patent
Jackson

(10) Patent No.: US 8,305,025 B2
(45) Date of Patent: Nov. 6, 2012

(54) METHODS AND APPARATUS FOR CONTROLLING MULTIPLE A.C. INDUCTION MACHINES FROM A SINGLE INVERTER

(75) Inventor: Robert D. Jackson, Lilburn, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 324 days.

(21) Appl. No.: 12/573,912

(22) Filed: Oct. 6, 2009

(65) Prior Publication Data

US 2010/0097027 A1  Apr. 22, 2010

Related U.S. Application Data

(60) Provisional application No. 61/103,322, filed on Oct. 7, 2008.

(51) Int. Cl.
*H02P 1/26* (2006.01)
*H02P 5/00* (2006.01)

(52) U.S. Cl. ......................... 318/730; 318/113

(58) Field of Classification Search .................. 318/113, 318/730
See application file for complete search history.

(56) References Cited

U.S. PATENT DOCUMENTS

| | | | |
|---|---|---|---|
| 1,717,852 A | 6/1929 | Pollock | |
| 2,500,595 A | 3/1950 | Young et al. | |
| 3,571,693 A * | 3/1971 | Riaz | 322/32 |
| 4,476,424 A | 10/1984 | Kalman | |
| 4,532,458 A | 7/1985 | Kuznetsov | |
| 5,083,077 A * | 1/1992 | Wallace et al. | 322/32 |
| 5,281,905 A * | 1/1994 | Dhyanchand et al. | 322/32 |
| 5,777,459 A * | 7/1998 | Bansal et al. | 322/47 |
| 6,445,079 B1 * | 9/2002 | Gale et al. | 290/31 |
| 7,193,378 B1 | 3/2007 | Welchko | |
| 7,554,238 B2 * | 6/2009 | Miyashita et al. | 310/184 |
| 7,990,098 B2 * | 8/2011 | Perisic et al. | 318/801 |
| 8,002,056 B2 * | 8/2011 | Chakrabarti et al. | 180/65.22 |

OTHER PUBLICATIONS

Emil Levi, "Recent Developments in High Performance Variable-Speed Multiphase Induction Motor Drive," Sixth International Symposium Nikola Tesla (Oct. 18-20, 2006).

Martin Jones et al., "A Six-Phase Series-Connected Two-Motor Drive With Decoupled Dynamic Control," IEEE Trans. Industry Applications, (41:4), pp. 1056-1066 (Jul./Aug. 2005).

Koiki Matsuse et al., "Characteristics of Speed Sensorless Vector Controlled Dual Induction Motor Drive Connected in Parallel Fed by a Single Inverter", IEEE Trans. Industry Applications, (40:1), pp. 153-161 (Jan./Feb. 2004).

Emil Levi et al., "A Five-Phase Two-Machine Vector Controlled Induction Motor Drive Supplied from a Single Inverter," EPE Journal, (14:3), pp. 38-48 (Aug. 2004).

Emil Levi et al., "An Even-Phase Multi-Motor Vector Controlled Drive with Single Inverter Supply and Series Connection of Stator Windings," IEE Proc.—Electric Power Applications, (152:5), pp. 580-590 (2003).

\* cited by examiner

*Primary Examiner* — Walter Benson
*Assistant Examiner* — Gabriel Agared

(57) ABSTRACT

Methods and apparatus are provided that include or provide a first three-phase induction machine including stator windings, a second three-phase induction machine including stator windings, wherein the stator windings of the first machine are coupled in series with the stator windings of the second machine, and an inverter circuit that provides a three-phase output signal coupled to the stator windings of the first machine. Other aspects are also provided.

26 Claims, 9 Drawing Sheets

METHODS AND APPARATUS FOR CONTROLLING MULTIPLE A.C. INDUCTION MACHINES FROM A SINGLE INVERTER

REFERENCE TO RELATED APPLICATIONS

This application claims the benefit of U.S. Provisional application Ser. No. 61/103,322, titled "A.C. MULTI MOTORS SYSTEM FROM COMMON INVERTER," filed Oct. 7, 2008, which is incorporated by reference herein in its entirety.

BACKGROUND

This invention relates to A.C. induction machines, and more particularly to methods and apparatus for controlling multiple A.C. induction machines from a single inverter.

SUMMARY

In a first aspect of the invention, a system is provided, the system including: (1) a first three-phase induction machine including stator windings, (2) a second three-phase induction machine including stator windings, wherein the stator windings of the first machine are coupled in series with the stator windings of the second machine, and (3) an inverter circuit that provides a three-phase output signal coupled to the stator windings of the first machine.

In a second aspect of the invention, a method is provided, the method including: (1) providing a first (2) providing a second three-phase induction machine including stator windings, (3) coupling the stator windings of the first machine in series with the stator windings of the second machine, and (4) providing an inverter circuit that provides a three-phase output signal coupled to the stator windings of the first machine.

Other features and aspects of the present invention will become more fully apparent from the following detailed description, the appended claims and the accompanying drawings.

BRIEF DESCRIPTION OF THE DRAWINGS

Features of the present invention can be more clearly understood from the following detailed description considered in conjunction with the following drawings, in which the same reference numerals denote the same elements throughout, and in which.

DETAILED DESCRIPTION

The present invention provides methods and apparatus for controlling multiple A.C. induction machines from a single inverter.

Figure 1:
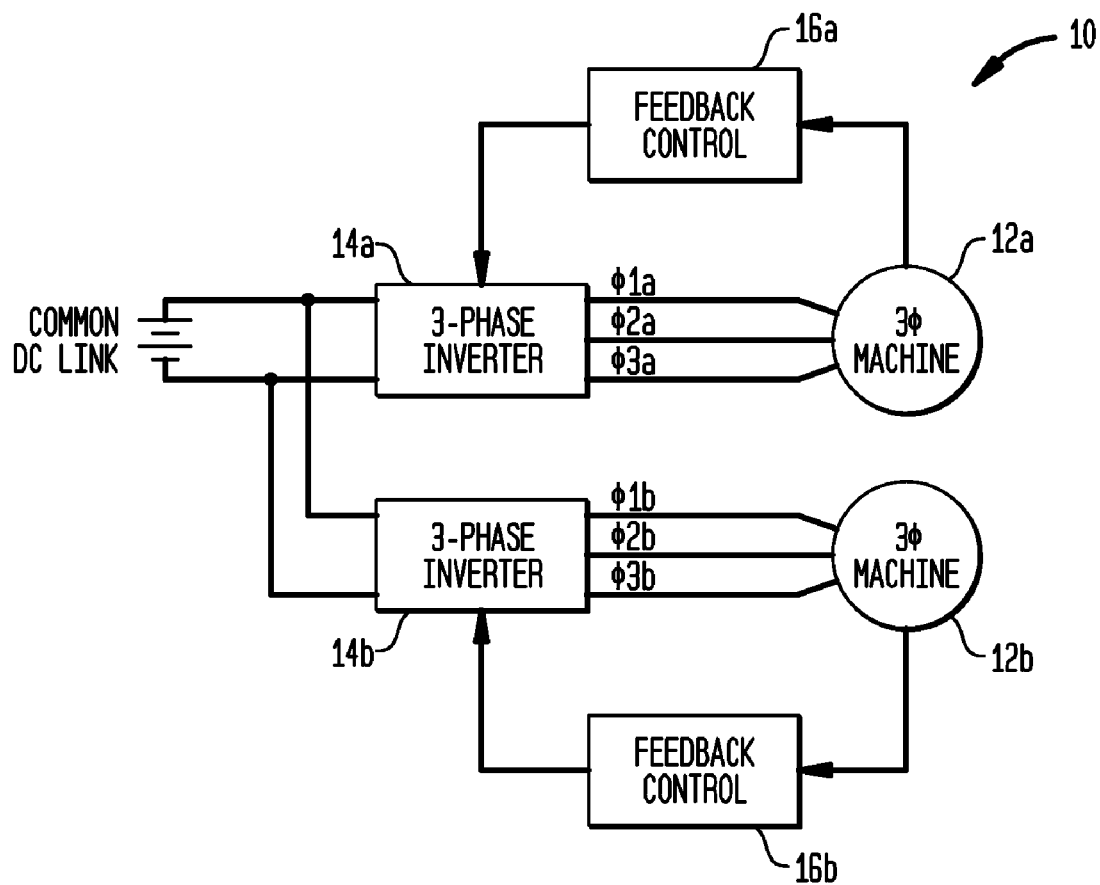
FIG. 1 is a simplified schematic of a previously known multi-machine drive system.

Numerous applications, such as construction equipment, textile and paper manufacturing equipment, and electric vehicles require multiple electric drives. In many such applications, multiple drive systems are implemented using A.C. induction machines and variable frequency drive controllers, commonly called "inverters." For example, FIG. 1 illustrates a previously known multiple drive system 10 that includes two 3-phase A.C. induction machines 12a and 12b, driven by 3-phase inverters 14a and 14b, respectively, which are coupled to a common D.C. supply. Feedback control circuits 16a and 16b provide closed loop control of inverters 14a and 14b, respectively, to independently control first and second machines 12a and 12b, respectively.

Although previously known system 10 has numerous advantages, for some applications, system 10 may be impractical and unnecessary. In particular, in some multiple drive system applications, the machines are directly coupled (e.g., through a common drive shaft), or indirectly coupled (e.g., through a common gear box), and require equal torque sharing between the multiple machines. In such instances, previously known multiple drive systems, such as system 10, require complex feedback control circuits 16a and 16b to achieve torque balancing between the two machines. In addition, the need for two inverters 14a and 14b adds to the cost, complexity and maintenance burden of the system.

To overcome these disadvantages, methods and apparatus in accordance with this invention provide multiple drive systems that include first and second three-phase induction machines whose stator windings are coupled in series, and a single inverter circuit that provides a three-phase output signal coupled to the stator windings of the first machine. Because the torque of each machine is a function of stator current and slip, and ignoring the effects of electrical and manufacturing tolerances, the two machines will provide substantially equal torque. In addition, as described in more detail below, for applications in which the machines are loosely coupled, the machine that experiences the greater resistance produces a greater amount of torque.

Figure 2A:
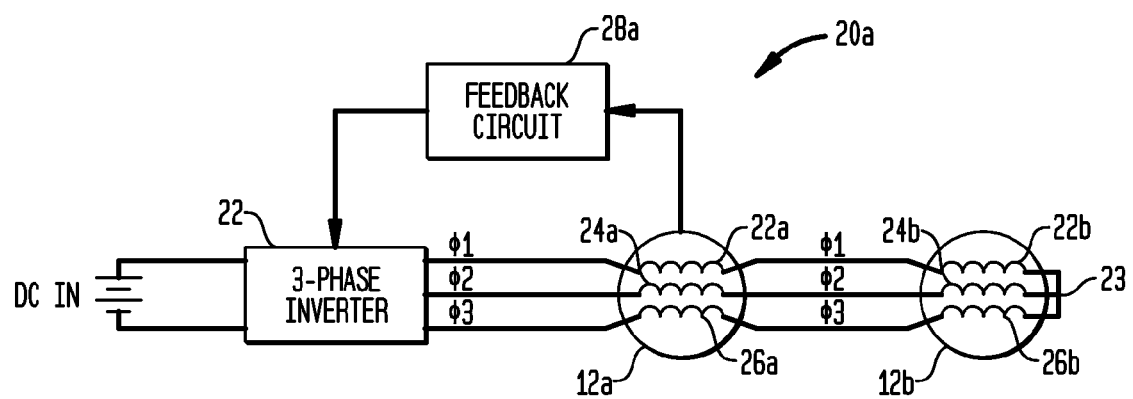
FIGS. 2A-2C are schematic diagrams of exemplary embodiments of multi-machine drive systems in accordance with this invention.

Referring now to FIG. 2A, an exemplary multiple-drive system in accordance with this invention is described. Multiple drive system 20a includes first and second machine 12a and 12b, respectively, 3-phase inverter 22 and feedback circuit 28a. First machine 12a includes stator windings 22a, 24a and 26a, and second machine 12b includes stator windings 22b, 24b and 26b. First machine 12a and second machine 12b may be conventional 3-phase A.C. induction machines, such as the DP10, 3 HP, 230/460V, 60 Hz motor supplied by Siemens industry, Alpharetta, Ga.

Three-phase inverter 22 converts a D.C. input voltage DC IN to three-phase A.C. drive signals φ1, φ2 and φ3, whose voltage and frequency may be controllably varied based on control signals provided to the inverter. For example, 3-phase inverter 22 may be a voltage source inverter, such as a Simovert P 6SE12 inverter supplied by Siemens Industry, Alpharetta, Ga. Persons of ordinary skill in the art will understand that other machines and/or inverters may be used.

Feedback control circuit 28a may be any conventional feedback circuit, such as a volts-per-Hertz ("V/Hz") control circuit, a current feedback circuit, a voltage feedback circuit, a speed feedback circuit, or other similar feedback circuit that provides feedback regarding one or more operating parameters of machines 12a and/or 12b to the control inputs of 3-phase inverter 22. Persons of ordinary skill in the art will understand that other feedback circuits may be used.

Figure 3A:
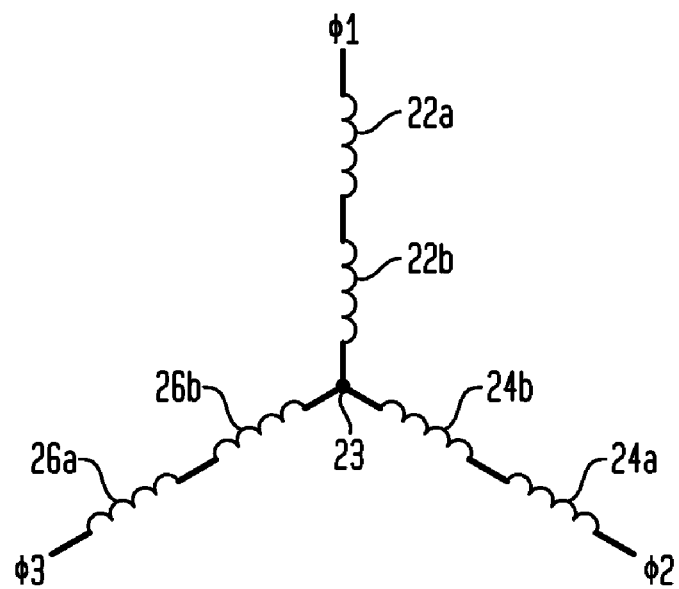
FIGS. 3A-3C are schematic diagrams of exemplary stator winding configurations in accordance with this invention.
Figure 3B:
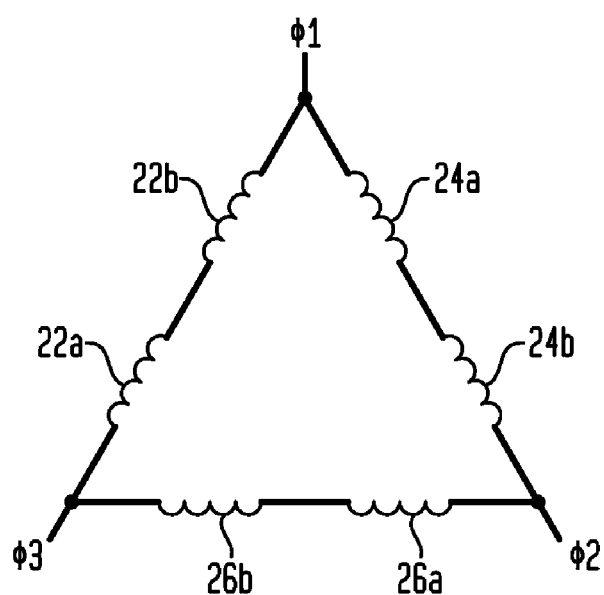

The stator windings of first machine 12a are coupled to drive signals φ1, φ2 and φ3, and are coupled in series with the stator windings of second machine 12b. In particular, stator windings 22a and 22b are coupled in series between drive signal φ1 and node 23, stator windings 24a and 24b are coupled in series between drive signal φ2 and node 23, and stator windings 26a and 26b are coupled in series between drive signal φ3 and node 23. In this regard, as shown in FIG. 3A, stator windings 22a-26a and 22b-26b are coupled in a Wye configuration. Persons of ordinary skill in the art will understand that stator windings 22a-26a and 22b-26b alternatively may be coupled in a Delta configuration, such as shown in FIG. 3B.

Referring again to FIG. 2A, feedback circuit 28a is coupled between first machine 12a and one or more control inputs on 3-phase inverter 22. Feedback circuit 28a provides feedback to 3-phase inverter 22 regarding one or more operating parameters of first machine 12a. For example, feedback circuit 28a may provide feedback regarding stator voltages, stator currents, rotor speed, or other similar operating parameter or combination of such parameters.

Figure 2B:
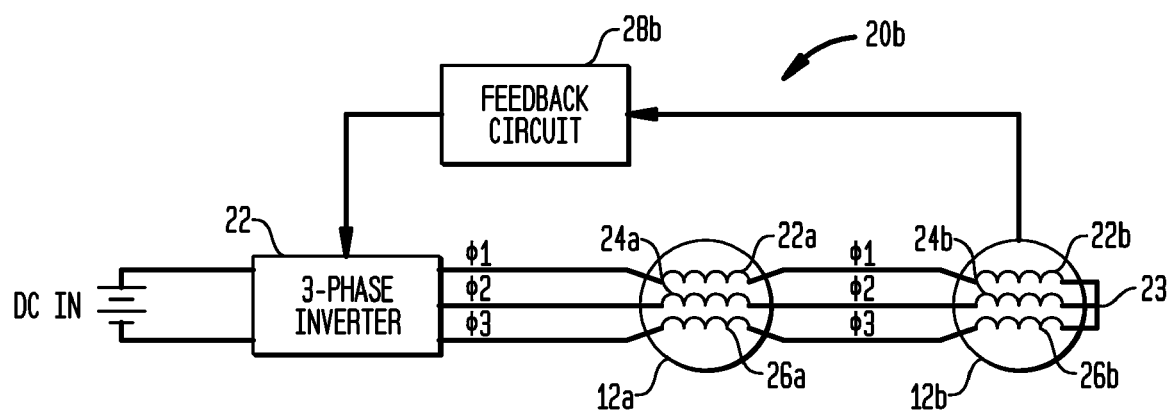
Figure 2C:
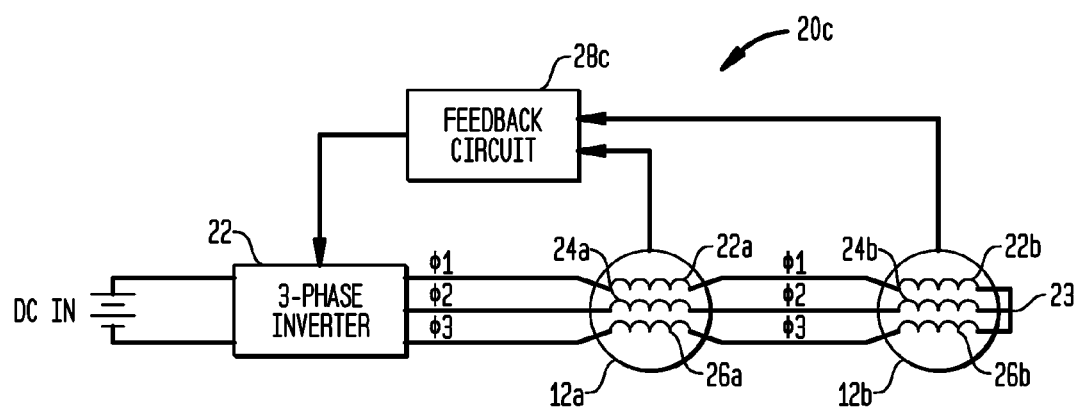

Persons of ordinary skill in the art will understand that methods and systems in accordance with this invention alternatively may provide feedback to 3-phase inverter 22 from second machine 12b. For example, as shown in FIG. 2B, feedback circuit 28b provides feedback to 3-phase inverter 22 regarding one or more operating parameters of second machine 12b. Alternatively, as shown in FIG. 2C, feedback circuit 28c provides feedback to 3-phase inverter 22 regarding one or more operating parameters of first machine 12a and second machine 12b.

Many 3-phase A.C. induction machines may be configured to operate from either of two supply voltages (e.g., a low voltage and high voltage). Indeed, a 3-phase A.C. induction machine may include six stator windings whose terminals may be configured by the user based on the supply voltage being used. Such A.C. induction machines may be used in accordance with this invention.

Figure 3C:
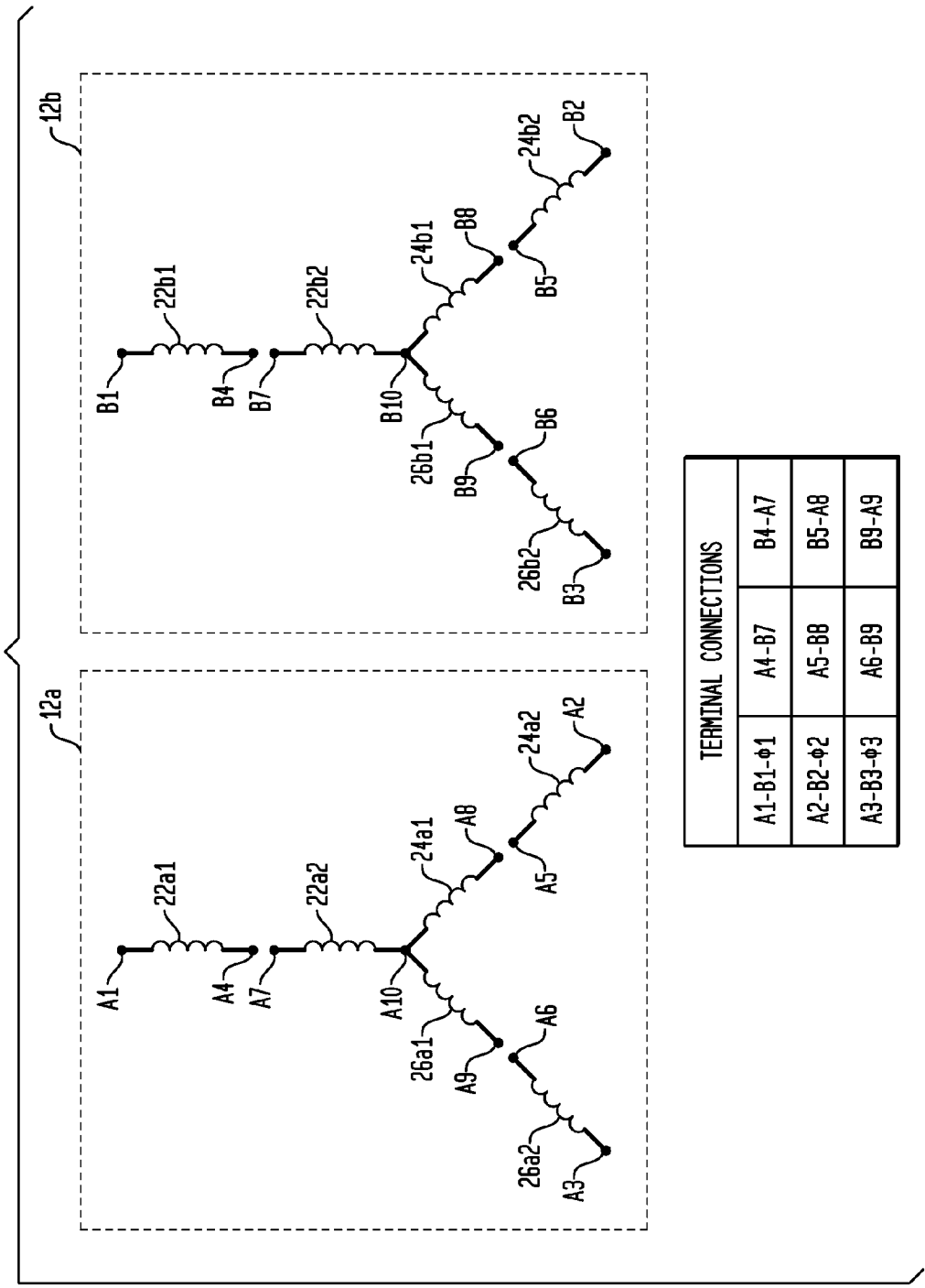

For example, as shown in FIG. 3C, first machine 12a may have the following six stator windings: (1) 22a1, having terminals A1 and A4; (2) 22a2, having terminals A7 and A10; (3) 24a1, having terminals A8 and A10; (4) 24a2, having terminals A2 and A5; (5) 26a1, having terminals A9 and A10; and (6) 26a2, having terminals A3 and A6. Similarly, second machine 12b may have the following six stator windings: (1) 22b1, having terminals B1 and B4; (2) 22b2, having terminals B7 and B10; (3) 24b1, having terminals B8 and B10; (4) 24b2, having terminals B2 and B5; (5) 26b1, having terminals B9 and B10; and (6) 26b2, having terminals B3 and B6.

The windings of such machines may be coupled in series as shown in the Connection Table included in FIG. 3C. In particular, φ1 is coupled to terminals A1 and B1, terminal A4 is coupled to terminal B7, and terminal B4 is coupled to terminal A7. Likewise, φ2 is coupled to terminals A2 and B2, terminal A5 is coupled to terminal B8, and terminal B5 is coupled to terminal A8. Similarly, φ3 is coupled to terminals A3 and B3, terminal A6 is coupled to terminal B9, and terminal B6 is coupled to terminal A9.

Figure 4A:
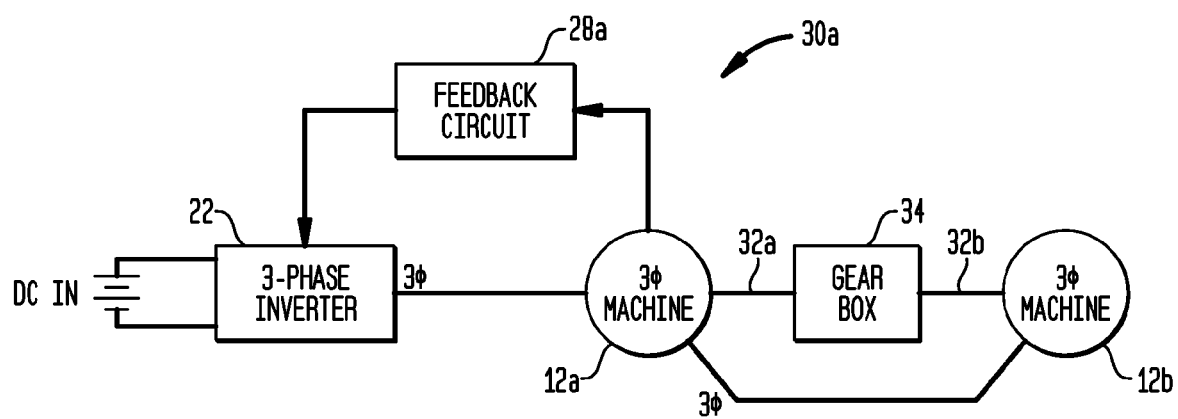
FIGS. 4A-4C are schematic diagrams of various exemplary embodiments of multi-machine drive systems in accordance with this invention.

As previously mentioned, in some multiple drive system applications, the machines are directly coupled (e.g., through a common drive shaft), indirectly coupled (e.g., through a common gear box), or loosely (e.g., through wheels on a common surface). Methods and apparatus in accordance with this invention may be used for such applications. For example, FIG. 4A illustrates an exemplary multiple drive system 30a in which first machine 12a is coupled to a first drive shaft 32a, second machine 12b is coupled to second drive shaft 32b, and first and second drive shafts 32a and 32b are coupled to a common gear box 34. In this regard, first and second machines 12a and 12b are indirectly coupled.

Figure 4B:
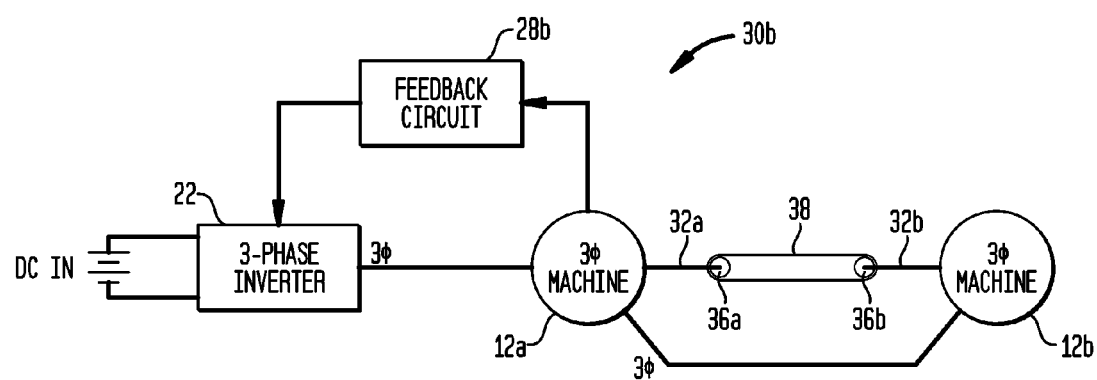
Figure 4C:
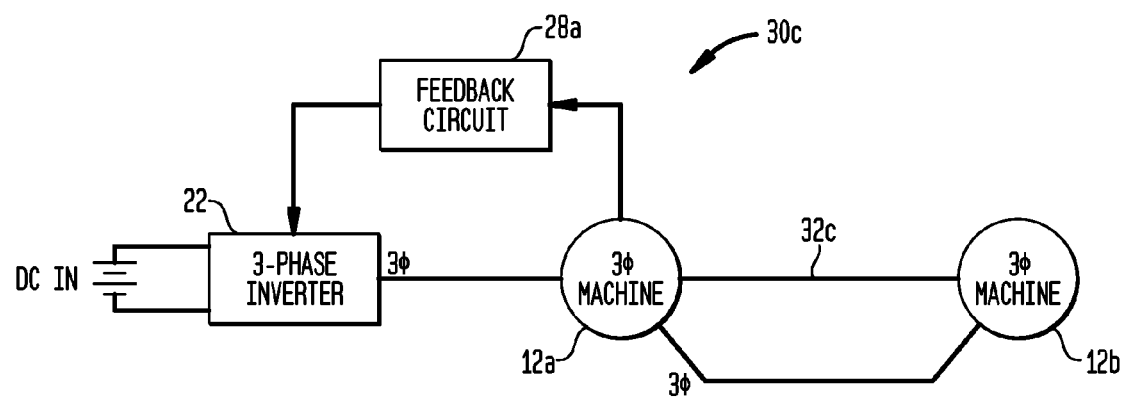

Likewise, FIG. 4B illustrates an alternative exemplary multiple drive system 30b in which first machine 12a is coupled to a first drive shaft 32a, which drives a pulley 36a, second machine 12b is coupled to second drive shaft 32b, which drives a pulley 36b, and a conveyor belt 38 is driven by pulleys 36a and 36b. As in the first example, first and second machines 12a and 12b are indirectly coupled. In contrast, FIG. 4C illustrates an alternative exemplary multiple drive system 30c in which first machine 12a and second machine 12b are both coupled to a common drive shaft 32c. In this regard, first and second machines 12a and 12b are directly coupled.

As mentioned above, in some applications, first machine 12a and second machine 12b may be loosely coupled. For example, in a Haul truck application, first machine 12a may drive a first wheel, second machine 12b may drive a second wheel, and the coupling surface of the two machines is the surface where the wheels contact the ground. In accordance with this invention, the machine that experiences the most resistance produces more torque.

The foregoing merely illustrates the principles of this invention, and various modifications can be made by persons of ordinary skill in the art without departing from the scope and spirit of this invention.

The invention claimed is:

1. A system comprising:
   a first three-phase induction machine comprising stator windings;
   a second three-phase induction machine comprising stator windings, wherein the stator windings of the first machine are coupled in series with the stator windings of the second machine;
   an inverter circuit that provides a three-phase output signal coupled to the stator windings of the first machine; and
   a single feedback circuit coupled to the inverter circuit, wherein the single feedback circuit is coupled to the first machine and/or the second machine.

2. The system of claim 1, wherein the first machine and the second machine comprise asynchronous induction machines.

3. The system of claim 1, wherein the system does not provide independent vector control of the first machine and the second machine.

4. The system of claim 1, wherein the single feedback circuit comprises any of a voltage-per-Hertz control circuit, a current feedback circuit, a voltage feedback circuit and a speed feedback circuit.

5. The system of claim 1, wherein the first machine produces a torque and the second machine produces a torque that substantially equals the first motor torque.

6. The system of claim 1, wherein the first machine further comprises a rotor, the second machine further comprises a rotor, and wherein the first machine rotor is coupled to the second machine rotor.

7. The system of claim 6, wherein the first machine rotor is directly connected to the second machine rotor.

8. The system of claim 6, wherein the first machine rotor is indirectly connected to the second machine rotor.

9. The system of claim 1, wherein the first machine rotor is coupled to a first drive shaft and the second machine rotor is coupled to a second drive shaft.

10. The system of claim 9, wherein the first and second drive shafts are the same drive shaft.

11. The system of claim 1, wherein the first machine rotor and the second machine rotor are coupled together via any of: a gearbox, a conveyor belt, a pulley, and a wheel.

12. The system of claim 1, wherein the stator windings of the first machine and the second machine are coupled in a Wye configuration.

13. The system of claim 1, wherein the stator windings of the first machine and the second machine are coupled in a Delta configuration.

14. A method comprising:
  providing a first three-phase induction machine comprising stator windings;
  providing a second three-phase induction machine comprising stator windings;
  coupling the stator windings of the first machine in series with the stator windings of the second machine;
  providing an inverter circuit that provides a three-phase output signal coupled to the stator windings of the first machine; and
  providing a single feedback circuit coupled to the inverter circuit, wherein the single feedback circuit is coupled to the first machine and/or the second machine.

15. The method of claim 14, wherein the first machine and the second machine comprise asynchronous induction machines.

16. The method of claim 14, wherein the method does not provide independent vector control of the first machine and the second machine.

17. The method of claim 14, wherein the single feedback circuit comprises any of a voltage-per-Hertz control circuit, a current feedback control circuit, a voltage feedback circuit and a speed feedback circuit.

18. The method of claim 14, wherein the first machine produces a torque and the second machine produces a torque that substantially equals the first motor torque.

19. The method of claim 14, wherein the first machine further comprises a rotor, the second machine further comprises a rotor, and wherein the method further comprises coupling the first machine rotor to the second machine rotor.

20. The method of claim 19, further comprising directly connecting the first machine rotor to the second machine rotor.

21. The method of claim 19, further comprising indirectly connecting the first machine rotor to the second machine rotor.

22. The method of claim 14, further comprising:
  coupling the first machine rotor to a first drive shaft; and
  coupling the second machine rotor to a second drive shaft.

23. The method of claim 22, wherein the first and second drive shafts are the same drive shaft.

24. The method of claim 14, further comprising coupling the first machine rotor and the second machine rotor together via any of: a gearbox, a conveyor belt, a pulley, and a wheel.

25. The method of claim 14, further comprising coupling the stator windings of the first machine and the second machine in a Wye configuration.

26. The method of claim 14, further comprising coupling the stator windings of the first machine and the second machine in a Delta configuration.

* * * * *